United States Patent
Codina

[15] 3,685,603
[45] Aug. 22, 1972

[54] WEIGHING APPARATUS

[72] Inventor: Jorge G. Codina, 223 Secor Road, Hartsdale, N.Y. 10530

[22] Filed: July 30, 1970

[21] Appl. No.: 59,606

[52] U.S. Cl............177/178, 177/185, 177/DIG. 5
[51] Int. Cl. ............................................G01g 23/32
[58] Field of Search....177/201, 210, DIG. 5, DIG. 6, 177/185, 178

[56] References Cited

UNITED STATES PATENTS

| | | |
|---|---|---|
| 3,195,663 | 7/1965 | Thompson............177/DIG. 5 |
| 2,148,523 | 2/1939 | Baermann, Jr. ...........177/201 |
| 2,455,532 | 12/1948 | Sunstein................177/DIG. 6 |
| 3,123,165 | 3/1964 | Carson, Jr. et al....177/DIG. 5 |

Primary Examiner—Stephen J. Tomsky
Assistant Examiner—George H. Miller, Jr.
Attorney—Theodore C. Jay, Jr.

[57] ABSTRACT

Apparatus for weighing objects comprising first and second vertical elongated members disposed one above the other. The upper member carries a weighing platform. The upper member is movable toward and away from the lower member. First and second magnet means secured respectively to the upper and lower members are vertically separated by forces of magnetic repulsion. As objects are placed on the platform, the separation decreases as the weight increases. The separation is measured to indicate weight.

1 Claim, 2 Drawing Figures

PATENTED AUG 22 1972  3,685,603

INVENTOR.
JORGE G. CODINA
BY
Theodore Jay Jr.
ATTORNEY

WEIGHING APPARATUS

SUMMARY OF THE INVENTION

I have invented an inexpensive weighing apparatus using a minimum number of readily available inexpensive components which can be used to measure a wide range of different weights of objects easily and quickly.

My invention is based upon the principle of magnetic repulsion. More particularly, I employ upper and lower vertically elongated members disposed in aligned position, with the upper member being movable toward and away from the lower member. First and second magnet means secured or attached to the upper and lower members respectively are disposed in vertically spaced position with like poles of both means facing each other. The magnetic repulsion forces thus developed maintain a fixed vertical separation between the two means in the absence of any external weight on the upper member.

I further provide a weighing platform secured to the upper member. When an object to be weighed is placed upon the platform, the additional weight forces the first magnetic means downward toward the second magnetic means thus reducing the vertical separation therebetween.

The vertical separation decreases as the weight of the object increase. I provide means responsive to the separation to provide a direct measurement thereof. The means is calibrated to provide a direct reading of the weight of any object being weighed.

DETAILED DESCRIPTION OF PREFERRED EMBODIMENTS

Figure 1:
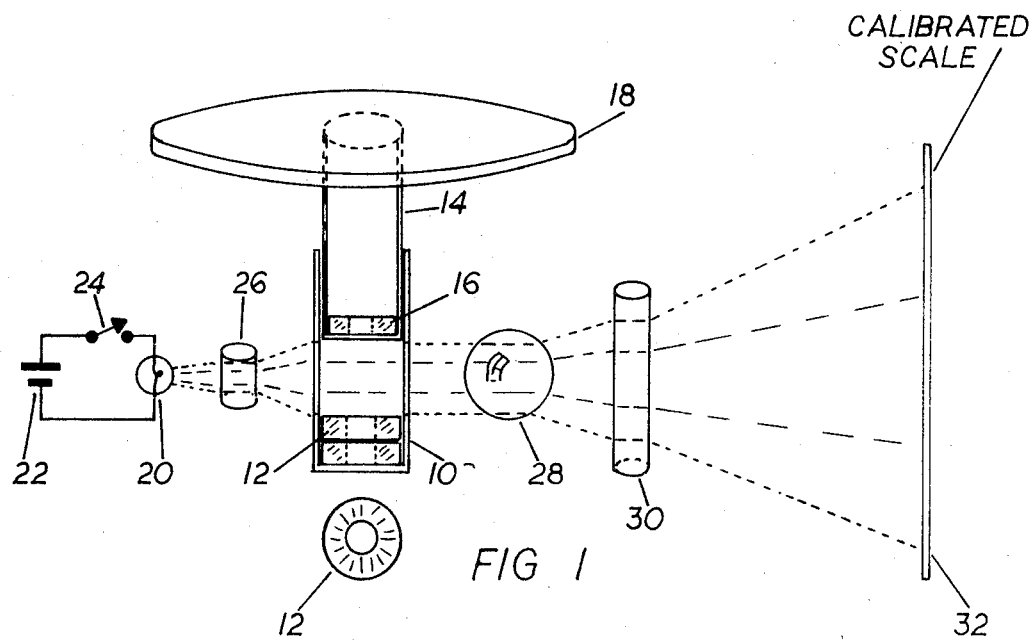
FIG. 1 is a view of one form of my invention.

Referring now to FIG. 1, a vertical hollow transparent plastic or glass cylinder 10 is open at the top end and closed at the bottom end. One or more horizontal torroidally shaped ceramic magnets 12 are disposed in the bottom of the cylinder. If more than one magnet 12 is used, the magnets are stacked one above the other with adjacent faces having opposite magnetic poles whereby the magnetic forces are additive.

A second hollow cylinder 14 of like material but smaller in diameter is vertically and slidably disposed in the cylinder 10. The bottom end of cylinder 14 is secured to another horizontal torroidal magnet 16 of like construction to magnets 12 but slighty smaller in diameter. Magnet 16 is disposed adjacent the top magnet 12, but these two magnets are so oriented as to have like poles on adjacent facing surfaces. A flat horizontal disc 18 of diameter larger than cylinder 10 is secured to the top end of cylinder 14. Disc 18 functions as a weighing platform on which objects to be weighed are placed.

When no objects are being weighed, the forces of magnetic repulsion between magnet 16 and top magnet 12 force magnet 16 upward with respect to the top magnet 12 until, at equilibrium, a fixed vertical separation exists therebetween.

When an object to be weighed is placed upon the platform, the additional weight on the cylinder 10 forces magnet 16 downward to decrease the vertical separation between magnet 16 and the top magnet 12. The separation continues to decrease as the weight increases. I calibrate the device by measuring decreases in separation obtained with known weights.

I employ a lens system and screen to provide a direct measure of weight of any object placed upon the platform. To this end, light from a small flashlight automobile type incandescent bulb 20, battery powered by cell 22, under the control of on-off switch 24, produces a beam of light which impinges upon a transparent, vertical, relatively small plastic rod 26. Rod 20 spreads this beam vertically until it strikes both the adjacent spaced magnets (which are opaque), as well as the space therebetween. The light passes through this space, then passes through transparent plastic sphere 28, and finally passes through a larger vertical transparent rod 30 onto a screen 32. As the separation between the adjacent spaced magnets increases and decreases, due to changes in weight, the length of the vertical line on screen 32 produced by the impinging light will increase and decrease. A properly calibrated scale on the screen enables the weight to be measured directly.

Figure 2:
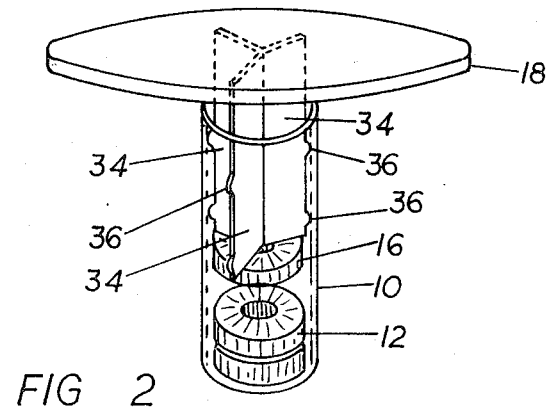
FIG. 2 is a detail view of a modification thereof.

FIG. 2 shows a modification of the structure of FIG. 1 in which the coefficient of sliding friction between the upper and lower members is minimized and the sensitivity of the apparatus is enhanced. To this end, cylinder 14 is replaced by a vertical structure having three like vertical vanes 34 extending radially outward from a common vertical axis aligned with the axis of cylinder 10. The outer vertical edge of each vane is provided with two spaced, outwardly extending, coplanar teeth 36. The points of these teeth are disposed adjacent the inner wall of cylinder 10 whereby only six points of contact can exist between the vaned structure and the cylinder 10, thus minimizing sliding friction.

I claim:
1. Apparatus for weighing objects, said apparatus comprising:
first and second vertical elongated non-magnetic transparent members disposed one above the other, the upper member being movable toward and away from the lower member, said members being slidable one within the other;
means interposed between the members to minimize siding function therebetween;
first and second opaque magnet means attached to the first and second members, said means being disposed in vertical spaced relation with like poles disposed adjacent each other, whereby magnetic forces of repulsion are exerted between both of said means to establish the vertical separation between said means, said separation having a fixed value when no object is being weighed;
a weighing platform secured to the upper member to receive said objects, the separation between the magnetic means decreasing with increasing object weight; and calibrated means responsive to the change in separation between the magnet means when an object is weighed to provide a direct reading of the weight of said object, said calibrated means including a light source and a lens system responsive to light from the source to direct a horizontal light beam between said magnet means and, after said beam has passed between said magnet means, vertically spreading said beam onto a vertical screen, said reading being displayed on said screen.

* * * * *